H. K. WHEELOCK.
VULCANIZER.
APPLICATION FILED FEB. 16, 1920.
1,340,642.
Patented May 18, 1920.
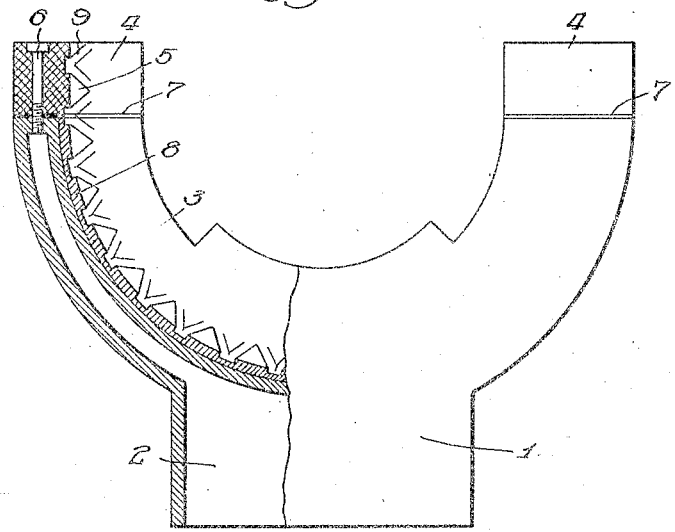
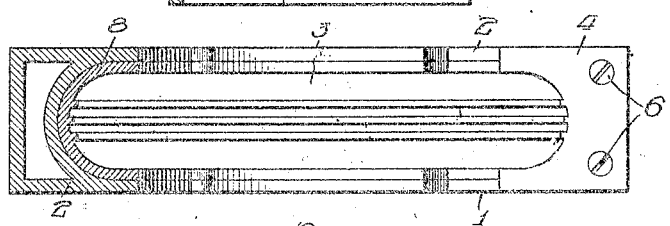
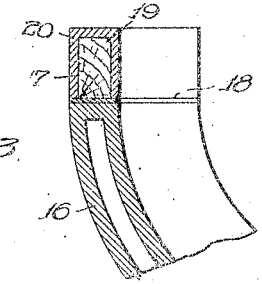
Witness:
Inventor:
Herbert K. Wheelock
By Wilkinson, Shirley, Byron & Knight
Attys.

UNITED STATES PATENT OFFICE.

HERBERT K. WHEELOCK, OF CHICAGO, ILLINOIS, ASSIGNOR TO WESTERN VULCANIZER MANUFACTURING COMPANY, A COPARTNERSHIP CONSISTING OF HERBERT K. WHEELOCK, FRANK A. WELLER, AND WALTER R. FONTAINE, OF CHICAGO, ILLINOIS.

VULCANIZER 1,340,642.     Specification of Letters Patent.     Patented May 18, 1920.

Original application filed November 30, 1917, Serial No. 204,688. Divided and this application filed February 16, 1920. Serial No. 359,085.

*To all whom it may concern:*

Be it known that I, HERBERT K. WHEELOCK, a citizen of the United States, residing at Chicago, in the county of Cook and State of Illinois, have invented certain new and useful Improvements in Vulcanizers, of which the following is a specification.

This invention relates to improvements in vulcanizers of the type designed for use in repairing pneumatic tires; and resides in the provision of apparatus of this character which is constructed and arranged so as to prevent the formation of mold marks or other objectionable irregularities at points on the tire where the ends of the vulcanizer engage with the tire.

This application constitutes a division of my co-pending application Serial No. 204,688, filed November 30, 1917.

I am aware of certain vulcanizers in which means are provided to avoid the formation of objectionable marks upon the tire such as above outlined, but in the majority of vulcanizers, the curing of a tire in the repairing or retreading thereof takes place up to the extreme ends of the mold, and inasmuch as the tires are usually firmly clamped in the mold, the sharp edges of the mold form depressions or mold marks and render the finished tire unsightly in appearance, giving it an unmistakably secondhand appearance.

I aim to overcome the above noted objections, and in carrying out my invention I provide separate end portions of non-heat-conducting material for my mold, so that little or no heat from the mold is transmitted to these end portions, and no vulcanizing or curing action is therefore had with relation to the tire about those portions thereof which are engaged with said end portions.

A further object of the invention is to provide a vulcanizer having a removable matrix and provided with removable end portions or blocks of non-heat-conducting material alining with the matrix and having facial formations corresponding to those of the matrix, so that a tire may be securely and evenly positioned within the mold of the vulcanizer and be smoothly and neatly molded by said matrix throughout the entire portion thereof which is subjected to the molding action, this being accomplished by providing the non-vulcanizing end portions with faces or configurations corresponding to those of the matrix.

The invention further consists in the particular construction, association and mode of operation of the various parts and elements of the apparatus such as described in the following specification, illustrated in the accompanying drawings, and finally pointed out in the appended claims.

In the drawings:

Figure 1 is a side elevation and partial vertical longitudinal section of the vulcanizing mold constructed in accordance with my invention, showing a matrix within the mold, and the end portions or blocks of the mold having faces of a formation corresponding to that of the matrix, the matrix being adapted to form a zigzag tread;

Fig. 2 is a plan of the apparatus shown in Fig. 1, showing one end of the mold broken away and in section, the matrix being of a different form as compared to that of the matrix shown in Fig. 1; and Fig. 3 is a fragmentary vertical sectional view of a modified form of the invention.

Referring particularly to the drawings, 1 designates as an entirety, a hollow vulcanizing mold of arcuate formation, having the customary central tank portion 2 for supplying steam, which, as is well known, performs the vulcanizing or curing action. This mold is provided with the usual arcuate tire-receiving groove 3, and is otherwise constructed in accordance with the general practice followed out in the manufacture of vulcanizers.

In carrying out my invention, the end portions of the mold 1 consist of blocks 4 of non-heat-conducting material, these blocks being formed with a tire-receiving groove 5, which is adapted to register with the groove 3 of the mold. These blocks 4 are preferably removably secured to the ends of the mold by bolts or screws 6, having their heads countersunk in the upper ends of the blocks.

I may interpose between the blocks and the ends of the molds, insulation sheets 7 of asbestos or other heat-insulating material. These sheets 7 provide a further means for retarding the transmission of heat from the mold to the blocks 4, thus preventing the vulcanizing of the tire where it contacts with the blocks and also assisting to prevent the formation of objectionable mold marks between the mold and the end blocks.

In certain classes of repair work, it is necessary to mold the repaired portion of the tire with special configurations. In this event, a matrix 8 is mounted within the mold throughout the entire length thereof, and the face of this matrix is flush with the tire-engaging faces of the blocks 4. This matrix 8 is removably disposed within the mold, and the faces of the blocks 4 are formed with configurations 9, which correspond to those of the matrix 8.

In repairing or vulcanizing a new section of a tire with the apparatus hereinbefore described and illustrated in the drawings, the tire is positioned in the ordinary manner by clamping within the mold, and during the vulcanizing the matrix 8 will mold the new portion of the tread of the tire so as to correspond in appearance with the remaining portion thereof already vulcanized. While the tire is being cured, the tread thereof will engage in the configurations 9 of the blocks 4, and it will be seen that the tire will be uniformly molded as to its tread formation and will have the appearance, more or less, of a new tire, rather than show mold marks such as would result from the use of the ordinary apparatus, which would give the unmistakable appearance of a second-hand or repaired tire.

The blocks 4 are preferably constructed of wood, but may be otherwise formed of some suitable material which is not subject to the ready retention and transmission of heat. Whatever pressure is brought upon the tire so as to cause the upper edges of the blocks to embed themselves in the rubber will not result, as in the case with the ordinary vulcanizing mold, in the formation of a depression or mold mark in the finished tire, since in the vulcanizer of my invention the blocks themselves prevent the vulcanization of these portions of the tire, and any mark formed by the upper edge of the end block is eliminated when the tire is moved around in the mold for the vulcanization of the next section in the retreading operation.

It will be seen that I may readily remove the matrix and coöperating end blocks and replace them with a matrix and end blocks having a different design.

In Fig. 3 I have illustrated a slightly modified form of the invention. The mold 16 is provided with an end block 17 removably secured to the mold, and the asbestos sheet 18 may be interposed between the mold 16 and the end block 17 if desired. In this form of end block 17, the body thereof is of non-heat-conducting material 19, such as wood, and is incased in a metal casing 20. This casing 20 is preferably made open on its lower side, but may be otherwise constructed if so desired. The open side of the casing 20 is opposed to the end of the mold 16. The transmission of heat is materially retarded by the presence of the non-heat-conducting material 19 within the casing 20, and also by the asbestos sheet 18.

With reference to the foregoing description and accompanying drawings, it will be seen that I have provided an improved vulcanizer of a simple and inexpensive construction, and which will permit of the repair of pneumatic tires in a neat, expeditious and reliable manner.

It will be understood that various minor changes in details of construction, and as to the size, shape and proportion of parts of the machine, may be resorted to when required without departing from the spirit and scope of the invention as defined.

In my co-pending application Serial No. 204,688, filed November 30, 1917, I have claimed my invention broadly and also specifically with relation to certain embodiments there illustrated.

In this application I claim other specific embodiments of my invention as illustrated in the accompanying drawings.

I claim:

1. A device of the character specified, comprising a mold casing shaped to fit a pneumatic tire, means for supplying steam to the casing, a removable matrix adapted to be arranged between the tire and the casing, means for clamping the casing on a tire, and cooling blocks of non-heat-conducting material at the ends of the casing and engaging the tire.

2. A vulcanizer, comprising a mold having an arcuate tire-receiving groove therein, and a block of non-metallic material secured to one end of the mold and being formed with a groove which is flush with the tire-receiving groove.

3. A vulcanizer, comprising a mold having an arcuate tire-receiving groove therein and non-metallic members mounted upon the ends of the mold which are flush with the tire-receiving groove in said mold.

4. A vulcanizer, comprising a mold having a tire-receiving groove therein, and blocks of non-metallic material abutting the extremities of said mold and having tire-receiving grooves therein adapted to register with the groove in said mold in flush relation to said mold groove.

5. A vulcanizer, comprising a mold having a tire-receiving groove therein, a block of non-heat-conducting material removably secured to the end of said mold and having a tire-receiving groove therein adapted to register with the groove in said mold, and a strip of insulating material between said block and the end of said mold.

6. A vulcanizer, comprising a mold having a tire-receiving groove therein, and a wooden block removably secured to the end of said mold and having a tire-receiving groove therein adapted to register with the groove in said mold.

Signed at Chicago, Illinois, this 12th day of February, 1920.

HERBERT K. WHEELOCK.